(12) United States Patent
Jaynes et al.

(10) Patent No.: US 9,933,013 B2
(45) Date of Patent: Apr. 3, 2018

(54) ALIGNMENT METER FOR A RAIL SYSTEM

(71) Applicant: Aesynt Incorporated, Warrendale, PA (US)

(72) Inventors: Robert Jaynes, Mars, PA (US); Lester Whiteman, McMurray, PA (US); Robert Eckert, Eighty Four, PA (US)

(73) Assignee: Aesynt Incorporated, Warrendale, PA (US)

( * ) Notice: Subject to any disclaimer, the term of this patent is extended or adjusted under 35 U.S.C. 154(b) by 304 days.

(21) Appl. No.: 14/625,123

(22) Filed: Feb. 18, 2015

(65) Prior Publication Data
US 2016/0238384 A1    Aug. 18, 2016

(51) Int. Cl.
| | |
|---|---|
| *F16C 29/00* | (2006.01) |
| *G01L 5/00* | (2006.01) |
| *G01B 7/31* | (2006.01) |
| *B61L 23/04* | (2006.01) |
| *B61L 27/00* | (2006.01) |
| *E01B 35/10* | (2006.01) |

(52) U.S. Cl.
CPC .......... *F16C 29/008* (2013.01); *B61L 23/042* (2013.01); *B61L 27/0088* (2013.01); *E01B 35/10* (2013.01); *F16C 29/001* (2013.01); *F16C 29/004* (2013.01); *G01B 7/31* (2013.01); *G01L 5/00* (2013.01); *F16C 2322/59* (2013.01); *Y10S 901/45* (2013.01)

(58) Field of Classification Search
CPC .... F16C 29/008; F16C 29/001; F16C 29/004; E01B 35/10; B61L 23/042; B61L 27/0088; G01B 7/31; G01L 5/00; Y10S 901/45

USPC ...... 73/862.629, 862.632, 862.633, 862.636, 73/862.381
See application file for complete search history.

(56) References Cited

U.S. PATENT DOCUMENTS

| | | | | |
|---|---|---|---|---|
| 4,968,155 A | * | 11/1990 | Bode ................. | B23Q 11/0032 384/25 |
| 5,535,631 A | * | 7/1996 | Paine ................. | G01G 3/1402 73/855 |
| 5,955,679 A | * | 9/1999 | Leon ....................... | G01B 7/18 73/774 |
| 6,044,991 A | * | 4/2000 | Freudenthal ............ | B66C 23/90 212/278 |
| 2001/0003924 A1 | * | 6/2001 | Alber ..................... | F16C 29/008 74/422 |
| 2002/0174687 A1 | * | 11/2002 | Cai ....................... | C03B 23/045 65/158 |
| 2004/0159157 A1 | * | 8/2004 | Sherman ............. | G01L 19/0092 73/708 |
| 2007/0237435 A1 | * | 10/2007 | Nagao ................... | F16C 29/043 384/44 |

(Continued)

*Primary Examiner* — Manish S Shah
*Assistant Examiner* — Suman K Nath
(74) *Attorney, Agent, or Firm* — The Webb Law Firm (57) ABSTRACT

An alignment meter for a rail system includes a housing defining a cavity, a flexible member connected to the housing, and at least one strain measuring element provided on the flexible member. The strain measuring element may be configured to measure the strain experienced by the flexible member. At least one strain measuring element may be positioned to measure strain in a horizontal direction relative to the flexible member. The at least one strain measuring element may be positioned to measure strain in a vertical direction relative to the flexible member.

16 Claims, 7 Drawing Sheets

(56) References Cited

U.S. PATENT DOCUMENTS

| | | | | |
|---|---|---|---|---|
| 2009/0161238 A1* | 6/2009 | Kosmowski | ......... | B23K 26/046 |
| | | | | 359/823 |
| 2011/0066278 A1* | 3/2011 | Pinault | ................. | A61N 5/1049 |
| | | | | 700/213 |
| 2011/0290037 A1* | 12/2011 | Delapierre | .............. | G01L 1/148 |
| | | | | 73/862.044 |
| 2015/0103332 A1* | 4/2015 | Ahlstedt | ................. | G01L 25/00 |
| | | | | 356/32 |

* cited by examiner

FIG. 8

ALIGNMENT METER FOR A RAIL SYSTEM

BACKGROUND OF THE INVENTION

Field of the Invention

This disclosure relates generally to linear rail systems and, more particularly, to an alignment meter for an automated robotic rail system.

Description of Related Art

Robotic linear rail systems are used in many different industrial applications, such as machining processes, retrieval processes, and assembly processes. Robotic rail systems provide an automated process that permits accurate, precise, and repeated movements to achieve a uniform process. Robotic rail systems may also be used in medication and/or medicament retrieval systems that utilize a robotic component to retrieve a desired medication and/or medicament from a storage container or room.

Robots and machinery, such as computer numerical control (CNC) machining, utilize robotic rail systems that include a linear rail and bearing blocks to move a robotic component from one position to another position. The robotic rail system may operate on a pre-programmed operation to ensure repeatable motions. The linear rails are machined to highly precise tolerances to ensure repeatable and accurate motions. Current manufacturers use high precision bearing blocks and a linear rail. When one bearing block and rail is used in the robotic rail system, the installation and operation of the rail system is relatively simple and successful. However, due to the high loading requirements imparted on the rails by the robotic components, multiple bearing blocks and/or multiple rails must be used in each direction of the robotic component or machine travel. Due to the tight tolerances, if the rails are not mounted perfectly straight and/or parallel to each other in multiple planes, the travel of the robotic component may destroy the linear rails and bearing blocks during operation.

Currently, several different types of indicators are used to notify an operator if the robotic rail system is misaligned. One method of avoiding misalignment of the robotic rail system is the use of hard geometry machined into the linear rail mounting surfaces by CNC machines to ensure that the linear rails are straight and parallel. This method does not require a meter to determine if the rails or bearing blocks are misaligned. However, the method is time intensive, costly, and requires high precision. Accordingly, this method is not always available or too costly for manufacturers to implement. This method also does not address rail systems that use rails with separate mounting platforms for each rail. Laser indicators and/or dial indicators may be used to properly align the rails of a rail system. However, these solutions are highly customized according to the particular rail system, costly, and cannot record geometry or strain profile information for later evaluation.

In view of the foregoing, a need exists for a meter for installing linear rails of a rail system that is cost effective, precise, and easily installed. A further need exists for a meter that identifies alignment problems (incorrectly machined mounting platforms, dirt or burrs on mounting surfaces, defective rails, defective bearing blocks, etc.) before the robotic component is placed into service. A further need exists for a meter that allows rail systems to be quickly inspected as a preventative maintenance measure.

SUMMARY OF THE INVENTION

In one aspect, an alignment meter for a rail system may include a housing defining a cavity, a flexible member connected to the housing, and at least one strain measuring element provided on the flexible member. The strain measuring element may be configured to measure the strain experienced by the flexible member.

The flexible member may be positioned in the cavity of the housing. The at least one strain measuring element may include at least two strain measuring elements. At least one strain measuring element may be positioned to measure strain in a horizontal direction relative to the flexible member. At least one strain measuring element may be positioned to measure strain in a vertical direction relative to the flexible member. The at least one strain measuring element may include at least three strain measuring elements. At least two strain measuring elements may be positioned to measure strain in a horizontal direction relative to the flexible member. At least one strain measuring element may be positioned to measure strain in a vertical direction relative to the flexible member. The housing may include at least two mounting portions to removably attach the flexible member to at least two bearing blocks. A microprocessor-based controller may be operatively connected to the at least one strain measuring element. The microprocessor-based controller may be configured to record strain measurements obtained by the at least one strain measuring element. A liquid crystal display screen may be provided on a front surface of the housing. The liquid crystal display screen may be configured to display the strain measured by the at least one strain measuring element. A plurality of magnitude visual indicators may be provided on a front surface of the housing. The magnitude visual indicators may be configured to display the magnitude of the strain measured by the at least one strain measuring element. A plurality of directional visual indicators may be provided on a front surface of the housing. The directional visual indicators may be configured to display the direction of the strain measured by the at least one strain measuring element.

In another aspect, a linear rail system may include at least one linear rail, at least two bearing blocks positioned to travel along the at least one linear rail, and an alignment meter arranged between the at least two bearing blocks. The alignment meter may include a housing defining a cavity, a flexible member connected to the housing, and at least one strain measuring element provided on the flexible member. A first end of the flexible member may be removably attached to a first one of the at least two bearing blocks and a second end of the flexible member may be removably attached to a second one of the at least two bearing blocks. The at least one strain measuring element may be configured to measure the strain experienced by the flexible member due to the misalignment of at least one of the at least one linear rail and the at least two bearing blocks.

The flexible member may be positioned in the cavity of the housing. The at least one strain measuring element may include at least two strain measuring elements. At least one strain measuring element may be positioned to measure strain in a horizontal direction relative to the flexible member. At least one strain measuring element may be positioned to measure strain in a vertical direction relative to the flexible member. The housing may include at least two mounting portions to removably attach the flexible member to the bearing blocks. A microprocessor-based controller may be operatively connected to the at least one strain measuring element. The microprocessor-based controller may be configured to record strain measurements obtained by the at least one strain measuring element. A liquid crystal display screen may be provided on a front surface of the housing. The liquid crystal display screen may be configured to display the stress measured by the at least one stress measuring element. A plurality of magnitude visual indicators may be provided on a front surface of the housing. The magnitude visual indicators may be configured to display the magnitude of the strain measured by the at least one strain measuring element. A plurality of directional visual indicators may be provided on a front surface of the housing. The directional visual indicators may be configured to display the direction of the strain measured by the at least one strain measuring element. A notification device may be remotely connected to the alignment meter. The notification device may be configured to display strain measurement information measured by the at least one strain measuring element. At least one robotic component may be connected to the at least two bearing blocks. The at least two bearing blocks may be configured to slide along the rail to move the robotic component from a first position to a second position.

In another aspect, a method of determining a proper alignment of a rail system may include removably attaching a flexible member between at least two bearing blocks positioned on a rail, the flexible member being removably attached to the bearing blocks; measuring strain experienced by the flexible member using at least one strain measuring element; and notifying an operator of the strain experienced by the flexible member. The method may also include connecting the flexible member to an alignment meter and notifying the operator of the strain experienced by the flexible member using visual indicators provided on a front surface of the alignment meter.

In another aspect, a linear rail system includes at least two linear rails, at least two bearing blocks, in which at least one bearing block may be positioned to travel along at least one linear rail, and an alignment meter arranged between the at least two bearing blocks. The alignment meter includes a housing defining a cavity, a flexible member connected to the housing, and at least one strain measuring element provided on the flexible member. A first end of the flexible member may be removably attached to a first one of the at least two bearing blocks and a second end of the flexible member may be removably attached to a second one of the at least two bearing blocks. The at least one strain measuring element may be configured to measure strain experienced by the flexible member due to misalignment of at least one of the at least two linear rails and the at least two bearing blocks.

The flexible member may be positioned in the cavity of the housing. The at least one strain measuring element may include at least three strain measuring elements. At least two strain measuring elements may be positioned to measure strain in a horizontal direction relative to the flexible member. At least one strain measuring element may be positioned to measure strain in a vertical direction relative to the flexible member. A microprocessor-based controller may be operatively connected to the at least one strain measuring element. The microprocessor-based controller may be configured to record strain measurements obtained by the at least one strain measuring element. A liquid crystal display screen may be provided on a front surface of the housing. The liquid crystal display screen may be configured to display the stress measured by the at least one stress measuring element. A plurality of magnitude visual indicators may be provided on a front surface of the housing. The magnitude visual indicators may be configured to display the magnitude of the strain measured by the at least one strain measuring element. A plurality of directional visual indicators may be provided on a front surface of the housing. The directional visual indicators may be configured to display the direction of the strain measured by the at least one strain measuring element. A notification device may be remotely connected to the alignment meter. The notification device may be configured to display strain measurement information measured by the at least one strain measuring element. At least one robotic component may be connected to the at least two bearing blocks. The at least two bearing blocks may be configured to slide along the rails to move the robotic component from a first position to a second position.

Further details and advantages will be understood from the following detailed description read in conjunction with the accompanying drawings.

DESCRIPTION OF THE DISCLOSURE

For purposes of the description hereinafter, spatial orientation terms, as used, shall relate to the referenced aspect as it is oriented in the accompanying drawings, figures, or otherwise described in the following description. However, it is to be understood that the aspects described hereinafter may assume many alternative variations and configurations. It is also to be understood that the specific components, devices, features, and operational sequences illustrated in the accompanying drawings, figures, or otherwise described herein are simply exemplary and should not be considered as limiting.

The present disclosure is directed to, in general, linear rail systems and, in particular, to an alignment meter for an automated robotic rail system. Certain preferred and non-limiting aspects of the components of the alignment meter are illustrated in FIGS. 1-7.

Figure 1:
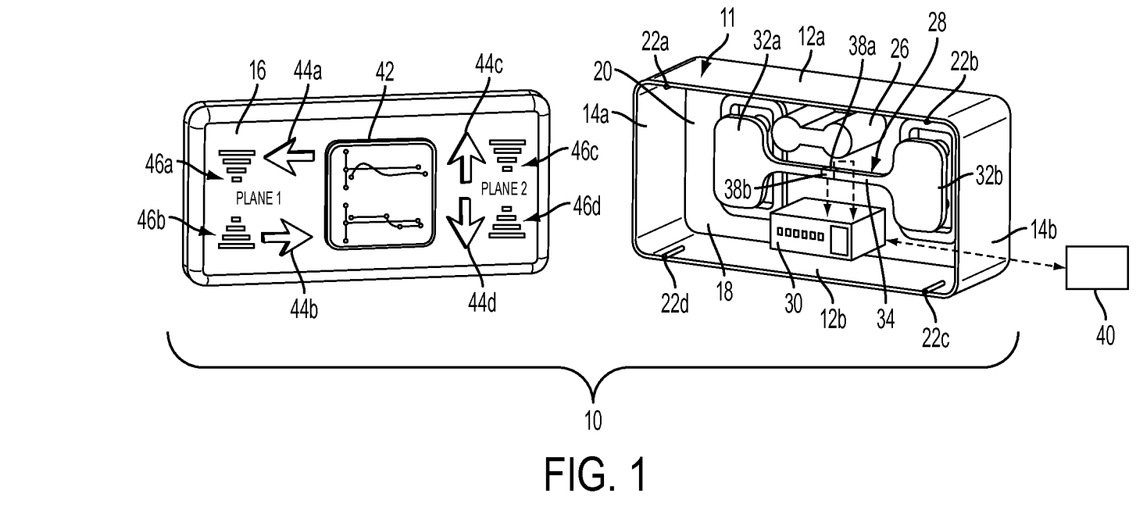
FIG. 1 is an exploded front perspective view of an alignment meter in accordance with one aspect of the present disclosure.
Figure 2:
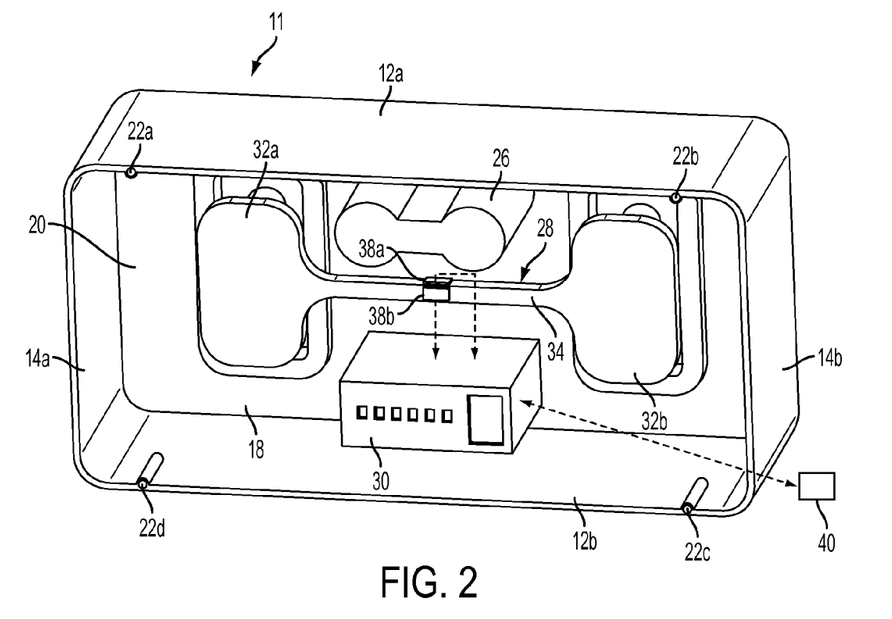
FIG. 2 is a front perspective view of the alignment meter of FIG. 1 with a front side of the alignment meter removed therefrom.
Figure 3:
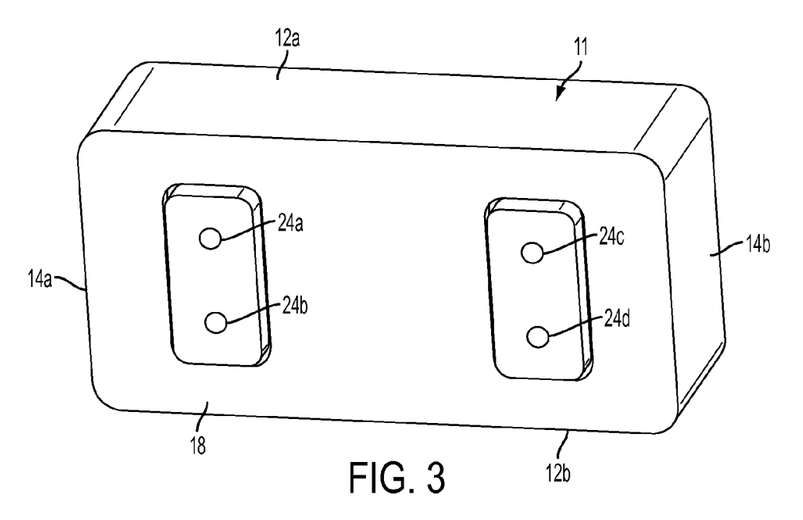
FIG. 3 is a rear perspective view of the alignment meter of FIG. 1.

With reference to FIGS. 1-4, an alignment meter 10 (hereinafter referred to as "meter 10") is shown. The meter 10 may be a handheld device easily transported and carried by an operator of a robotic rail system 100 (shown in FIGS. 5-7). It is also contemplated that the meter. 10 may be a permanent fixture installed on the rail system 100. The meter 10 may have a housing 11 that includes a substantially rectangular cross-sectional shape including two long sides 12a, 12b, two short sides 14a, 14b, a front side 16, and a rear side 18. It is also contemplated that the meter 10 may have alternative cross-sectional shapes, such as square, circular, oval, or triangular. The meter 10 may have a substantially cuboid shape and may define a cavity 20 therein. The cavity 20 may be configured to hold the inner components of the meter 10, as will be described hereinbelow. The front side 16 of the meter 10 may be configured as a lid for the meter 10, thereby allowing access to the cavity 20 by an operator. The front side 16 may be fixedly attached to the meter 10 or may be removably attached to the meter 10 using hinges, adhesives, latches, pins, snap-fit connections, friction fit connections, or any other well-known connection method. As shown in FIGS. 1 and 2, the front side 16 may be removably attached to the rest of the meter 10 using pins (not shown) extending from the front side 16 and small holes 22a-22d defined in the two longs sides 12a, 12b of the meter 10. The pins may be friction fit into the holes 22a-22d. The front side 16 may be formed as a separate component from the rest of the meter 10 or the front side 16 and the housing 11 of the meter 10 may be formed as a single monolithic structure. As shown in FIG. 3, the meter 10 may define at least two apertures 24a-24d in the rear side 18 of the meter 10. The apertures 24a-24d may be configured to receive a fastener or connection member, as will be described in greater detail hereinbelow. It is contemplated that more than two apertures 24a-24d may be defined in the rear side 18 of the meter 10. In one aspect, two apertures 24a, 24b may be defined in one side of the rear side 18 and two apertures 24c, 24d may be defined in an opposing side of the rear side 18. In one aspect, a reference edge (not shown) positioned above the apertures 24a, 24c may be provided to assist in positioning the meter 10 on a pair of bearing blocks 110a, 110b (shown in FIGS. 5-8). The reference edge may be configured to align with a corresponding reference edge on the bearing blocks 110a, 110b to ensure that the meter 10 is oriented at the correct position during installation of the meter 10. Upon the abutment of the reference edges of the meter 10 against the reference edges of the bearing blocks 110a, 110b, the operator is notified that the correct position of the meter 10 on the bearing blocks 110a, 110b has been achieved.

As shown in FIGS. 1 and 2, the meter 10 may house a battery pack 26, a flexible member 28, and a microprocessor-based controller (MBC) 30. The battery pack 26 may be configured to provide power to the meter 10 to operate the inner components of the meter 10. One of skill in the art will understand that the battery pack 26 may be any type of battery, including alkaline batteries, non-rechargeable batteries, and rechargeable batteries. The battery pack 26 may be attached to a bottom surface of the upper long side 12a of the meter 10. It is also contemplated that the meter 10 may also include a hardwired connection to power the meter 10 via a remote source, such as a generator, an external battery pack, or a wall outlet. The battery pack 26 may be configured to provide electrical power to the MBC 30 and the outer visual components of the front side 16 of the meter 10, which is described hereinbelow.

The flexible member 28 may include at least two attachment portions 32a, 32b and a cross member 34. In one aspect, a flexible member may be understood to be a component that is easily bent without breaking. The flexible member 28 may be internally housed within the meter 10. One attachment portion 32a may be fixedly attached to the meter 10, while the other attachment portion 32b is freely displaced within the meter 10. The attachment portions 32a, 32b may be substantially rectangular and may be connected to one another by the cross member 34. The flexible member 28 may be configured to bend in proportion to forces applied to the flexible member 28. In one aspect, the flexible member 28 may be made of metal. It is also contemplated that the flexible member 28 may also be made from plastic. The flexible member 28 may be removably attached to bearing blocks 110a, 110b (as shown in FIGS. 5-8) of the rail system 100, as described in greater detail hereinbelow. One attachment portion 32a of the flexible member 28 may be fixedly attached to the meter 10 and the bearing block 110a, while the other attachment portion 32b is fixedly attached to the other bearing block 110b, but not the meter 10. In one aspect shown in FIG. 8, the attachment portions 32a, 32b of the flexible member 28 may be attached to the bearing blocks 110a, 110b through the use of at least one tapped aperture 24a-24d on each attachment portion 32a, 32b of the flexible member 28 and a clearance pin on the bearing blocks 110a, 110b. In another aspect, the bearing blocks 110a, 110b could include the tapped aperture and the attachment portions 32a, 32b of the flexible member 28 could include a clearance pin. It is also contemplated that the flexible member 28 may be directly attached to the bearing blocks 110a, 110b without being housed in the meter 10 (as shown in FIG. 8). The flexible member 28 may be hardwired or remotely connected to the meter 10.

As shown in FIGS. 1 and 2, at least two strain measuring elements 38a, 38b may be attached to the cross member 34 of the flexible member 28. In one aspect, the strain measuring elements 38a, 38b may be strain gauges. In another aspect, the strain measuring elements 38a, 38b may be piezoelectric sensors. The strain measuring elements 38a, 38b may be removably attached to the flexible member 28 using an adhesive or fasteners. At least one strain measuring element 38a may be provided on an upper surface of the cross member 34 of the flexible member 28. At least one strain measuring element 38b may be provided on a side surface of the cross member 34 of the flexible member 28. As shown in FIG. 8, at least one other strain measuring element 38c may be provided on an opposing side surface of the cross member 34 of the flexible member 28. It is to be understood that one strain measuring element 38a, 38b may be provided on the flexible member 28. The strain measuring elements 38a, 38b may be configured to measure the strain in the flexible member 28 according to the strains applied to the flexible member 28. The strain measuring element 38a provided on the upper surface of the cross member 34 may be configured to measure the strain in a horizontal direction relative to the flexible member 28. The strain measuring element 38b provided on the side surface of the cross member 34 may be configured to measure the strain in a vertical direction relative to the flexible member 28. It is also to be understood, however, that additional strain measuring elements may be provided on the cross member 34 to obtain a more accurate or detailed reading of the strains being applied to the flexible member 28. In one aspect, a torsion or twist experienced by the flexible member 28 may also be derived from the readings of two additional strain measuring elements(not shown), but placed opposite each other and rotated 90 degrees in orientation. In this aspect, however, the cross member 34 of the flexible member 28 will have a circular cross-section to obtain the desired torsional measurements.

The MBC 30 may be a digital computer used for the automation of the electromechanical processes of the meter 10. The MBC 30 may be configured to be a memory module that is used to store a library of alignment tolerances for several systems, vendor specification sheets, or recordings of previous linear profile mappings of the rail system 100. In one aspect, the MBC 30 may be a programmable logic controller. The strain measurements that are taken by the strain measuring elements 38a-38c may be directed or relayed to the MBC 30. The MBC 30 may relay this strain information to be displayed on the front side 16 of the meter 10, as described hereinbelow. The strain measurements determined by the MBC 30 may be compared to the library of alignment tolerances for several robotic rail systems, vendor specification sheets, or recordings of previous linear profile mappings to determine if the rails 112a, 112b of a robotic rail system 100 are straight and/or parallel to one another (shown in FIGS. 5-7). Based on the difference between the measured strains from the strain measuring elements 38a-38c and the previous strain measurements, the MBC 30 may provide an alert or indication on the front side 16 of the meter 10 notifying an individual that the rails 112a; 112b are misaligned as indicated by the bearing blocks 110a, 110b. The MBC 30 may also be hardwired to a notification device 40, such as an indicator panel provided directly on a portion of the rail system 100, a control panel of the rail system 100, or a control panel and/or a central processing unit (CPU) provided in an adjacent area of the rail system 100. It is also contemplated that the MBC 30 may be wirelessly or remotely connected to a notification device 40 using a Wi-Fi connection or cellular connection. In this aspect, the notification device 40 may be a remote handheld unit held by an operator of the rail system 100. The MBC 30 may send the strain measurement information to the notification device 40 to alert an individual of a misaligned rail 112a, 112b. The notification device 40 may also store the strain measurement information in a CPU for comparison of different strain measurements obtained in the future.

Figure 4:
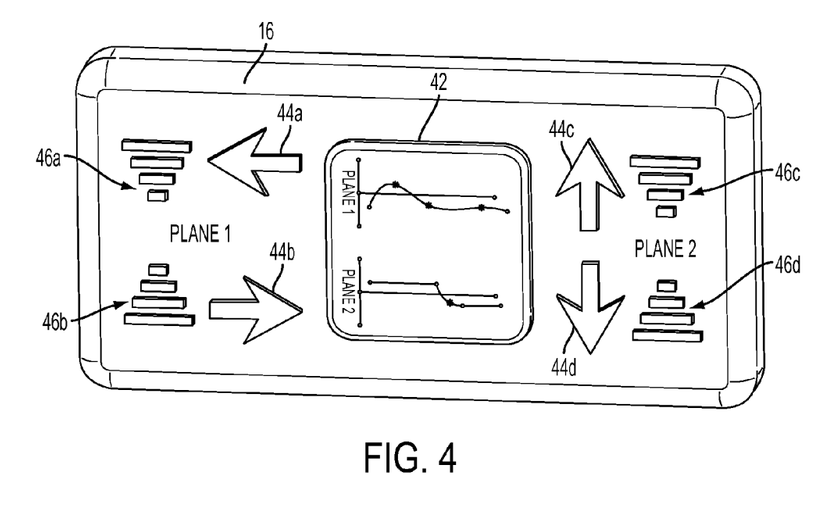
FIG. 4 is a front perspective view of the front side of the alignment meter of FIG. 1.

As shown in FIGS. 1 and 4, the front side 16 of the meter 10 may include a plurality of visual indicators to identify the strains that are measured by the strain measuring elements 38a-38c. The visual indicators may be configured to give the axis, direction, and magnitude of the alignment diversions or the corresponding correctional information to counteract the deviation. A liquid crystal display (LCD) screen 42 may be provided on the front side 16 of the meter 10. It is to be understood, however, that any type of display screen may be provided on the front side 16 of the meter 10. The LCD screen 42 may be configured to display the different strain and voltage measurements measured by the strain measuring elements 38a-38c. The LCD screen 42 may receive this information from the MBC 30 and display this information to notify an operator if the the rails 112a, 112b are misaligned (i.e., not straight or not parallel) as indicated by the position of the bearing blocks 110a, 110b on the rails 112a, 112b. The LCD screen 42 may be powered by the battery pack 26. The LCD screen 42 may be configured to display the magnitude of the strains causing the misalignment of the rails 112a, 112b on the rail system 100. The LCD screen 42 may also be configured to display the straightness of the rails 112a, 112b in the rail system 100. This information may be displayed in a graphical representation, pictorial representation, and/or textual representation.

With continued reference to FIGS. 1 and 4, the front side 16 of the meter 10 may also include a plurality of directional visual indicators 44a-44d. The directional visual indicators 44a-44d may be configured to identify to and notify an operator of the direction in which rails 112a, 112b are misaligned on the rail system 100 as indicated by the bearing blocks 110a, 110b. Two of the directional visual indicators 44a, 44b may be configured to identify the horizontal alignment of the bearing block 110a, 110b. In one aspect, if the bearing blocks 110a, 110b and/or rails 112a, 112b are misaligned in the left-hand direction, a first directional visual indicator 44a may illuminate. Likewise, if the bearing blocks 110a, 110b are misaligned in a right-hand direction, a second directional visual indicator 44b may illuminate. Based on this notification, the rails 112a, 112b may be adjusted on the rail system 100 into proper alignment. It is also to be understood that the first and second directional visual indicators 44a, 44b may be configured to illuminate to provide a correctional notification to notify an operator in which direction the rail 112a, 112b must be moved to gain proper alignment. For example, if the bearing blocks 110a, 110b and/or rails 112a, 112b are misaligned in the right-hand direction, the first directional visual indicator 44a may illuminate to notify the operator that the rails 112a, 112b should be moved in the left-hand direction to correct the alignment. In a similar manner, two of the direction visual indicators 44c, 44d may be configured to identify the vertical alignment of the bearing blocks 110a, 110b and/or rails 112a, 112b. In one aspect, if the bearing blocks 110a, 110b and/or rails 112a, 112b are misaligned in an upward direction, a third directional visual indicator 44c may illuminate. Likewise, if the bearing blocks 110a, 110b and/or rails 112a, 112b are misaligned in a downward direction, a fourth directional visual indicator 44d may illuminate. Based on the notification, the rails 112a, 112b may be adjusted on the rail system 100 into proper alignment. It is also to be understood that the third and fourth directional visual indicators 44c, 44d may be configured to illuminate to provide a correctional notification to an operator to notify him/her in which direction the rails 112a, 112b must be moved to gain proper alignment. For example, if the bearing blocks 110a, 110b and/or rails 112a, 112b are misaligned in an upward direction, the fourth directional visual indicator 44d may illuminate to notify the operator that the rails 112a, 112b should be moved in a downward direction to correct the alignment.

With continued reference to FIGS. 1 and 4, the front side 16 of the meter 10 may also include a plurality of magnitude visual indicators 46a-46d. Each set of magnitude visual indicators 46a-46d may include at least one light that illuminates according to the magnitude of the strains applied to the flexible member 28. It is also contemplated that more than one light may be provided in each magnitude visual indicator 46a-46d. The magnitude visual indicators 46a-46d may be configured to identify to and notify an operator the magnitude of the strains that are being applied to the flexible member 28 based on the misalignment of the bearing blocks 110a, 110b on the rail system 100 and/or the misalignment of the rails 112a, 112b. A first magnitude visual indicator 46a may correspond to the first directional visual indicator 44a. Therefore, if the bearing blocks 110a, 110b and/or rails 112a, 112b are misaligned in the left-hand direction, the first directional visual indicator 44a will illuminate and the first magnitude visual indicator 46a will illuminate according to the magnitude of the strain applied in the left-hand direction. In a similar manner, a second magnitude visual indicator 46b may correspond to the second directional visual indicator 44b. Therefore, if the bearing blocks 110a, 110b and/or rails 112a, 112b are misaligned in the right-hand direction, the second directional visual indicator 44b will illuminate and the second magnitude visual indicator 46b will illuminate according to the magnitude of the strain applied in the right-hand direction. In a similar manner, a third magnitude visual indicator 46c may correspond to the third directional visual indicator 44c. Therefore, if the bearing blocks 110a, 110b and/or rails 112a, 112b are misaligned in the upward direction, the third directional visual indicator 44c will illuminate and the third magnitude visual indicator 46c will illuminate according to the magnitude of the strain applied in the upward direction. In a similar manner, a fourth magnitude visual indicator 46d may correspond to the fourth directional visual indicator 44d. Therefore, if the bearing blocks 110a, 110b and/or rails 112a, 112b are misaligned in the downward direction, the fourth directional visual indicator 44d will illuminate and the fourth magnitude visual indicator 46d will illuminate according to the magnitude of the strain applied in the downward direction.

It is to be understood that the meter 10 may be provided with only an LCD screen 42 to display the alignment information to the operator. It is also to be understood that the meter 10 may be provided with only the directional visual indicators 44a-44d and the magnitude visual indicators 46a-46d. Further, it is also contemplated that the meter 10 may be provided with the LCD screen 42, the directional visual indicators 44a-44d, and the magnitude visual indicators 46a-46d.

The MBC 30 may be configured to send the strain measurement information to the LCD screen 42, the directional visual indicators 44a-44d, and the magnitude visual indicators 46a-46d. Therefore, by using the LCD screen 42, the directional visual indicators 44a-44d, and the magnitude visual indicators 46a-46d to display the strain measurements experienced by the flexible member 28, an operator may be notified of the magnitude, axis, and directional information regarding the misalignment of the bearing blocks 110a, 110b on the rail system 100 and/or the misalignment of the rails 112a, 112b. Using the magnitude, axis, and directional information, the operator can properly align the rails 112a, 112b on the rail system 100 to avoid operational binding of the bearing blocks 110a, 110b on the rail system 100.

It is also contemplated that the meter 10 may include a more cost-effective notification arrangement on the front side 16 of the meter 10. As the bearing blocks 110a, 110b are moved down the rails 112a, 112b, any offset or misalignment in the rails 112a, 112b will cause a twist or strain on the flexible member 28 and, thereby, the strain measuring elements 38a, 38b. The signal derived from the strain measuring elements 38a-38c may be amplified via an instrumentation amplifier (not shown) and compared to selected reference voltages that correspond to voltages of a properly aligned rail system 100. The higher the amplitude of the voltage emitted from the strain measuring elements 38a-38c, the more LEDs are illuminated on the front side 16 of the meter 10 indicating an increased strain applied to the flexible member 28. It is to be understood that any number of LEDs may be used to provide an increased resolution for notifying an operator of the strains being applied to the flexible member 28. The voltage references and polarity input to the amplifier may be selected so the lower LEDs on the front side 16 of the meter 10 indicate a negative direction and the upper LEDs on the front side 16 of the meter 10 indicate a positive direction. Further, additional circuitry may be added to provide "fine tuning adjustment" or zero offsetting for the voltage references so as to maintain the proper alignment of the rail system 100.

Figure 5:
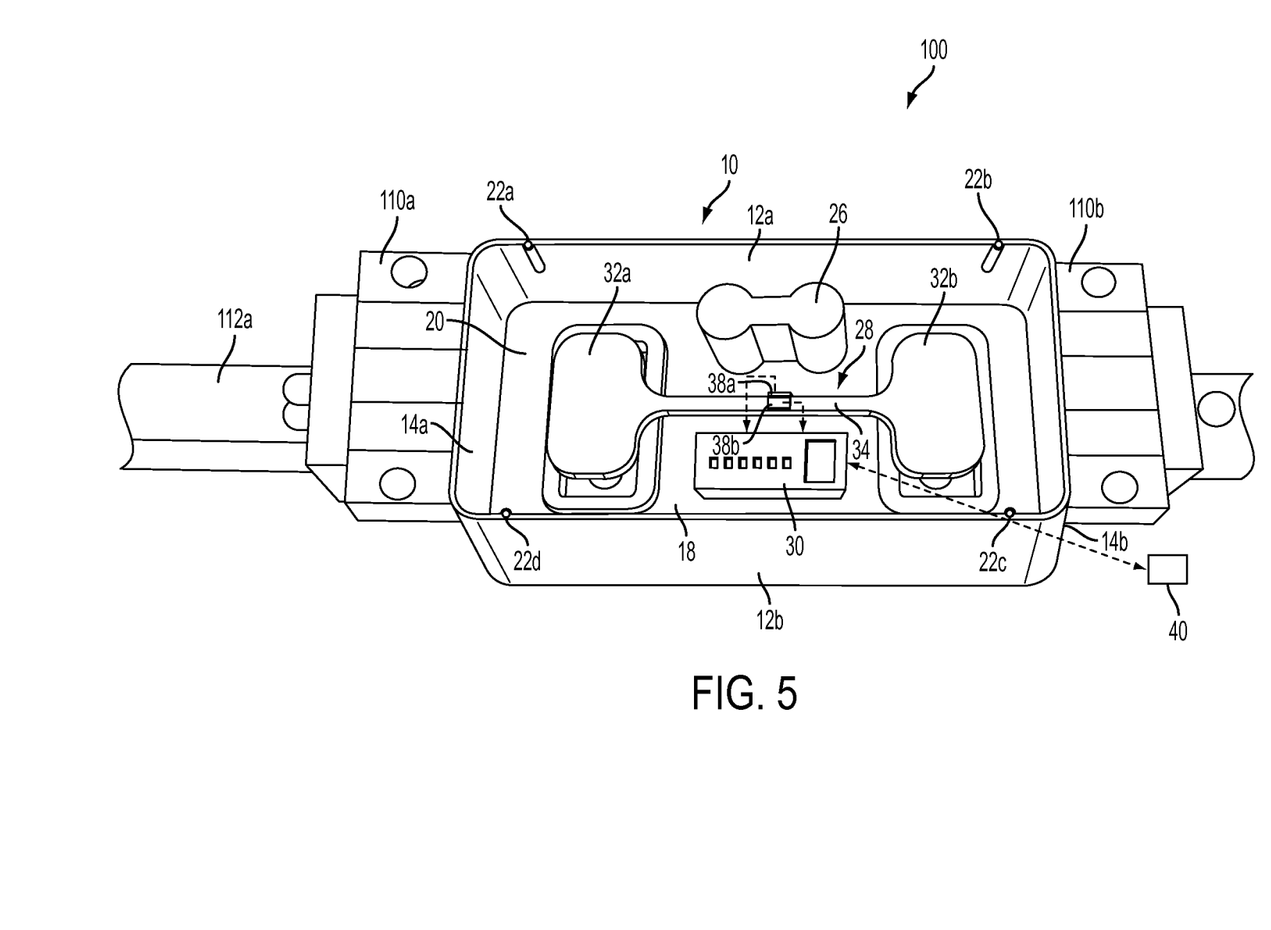
FIG. 5 is a front perspective view of a rail system in accordance with one aspect of the present disclosure including the alignment meter of FIG. 1 with the front side removed.
Figure 6:
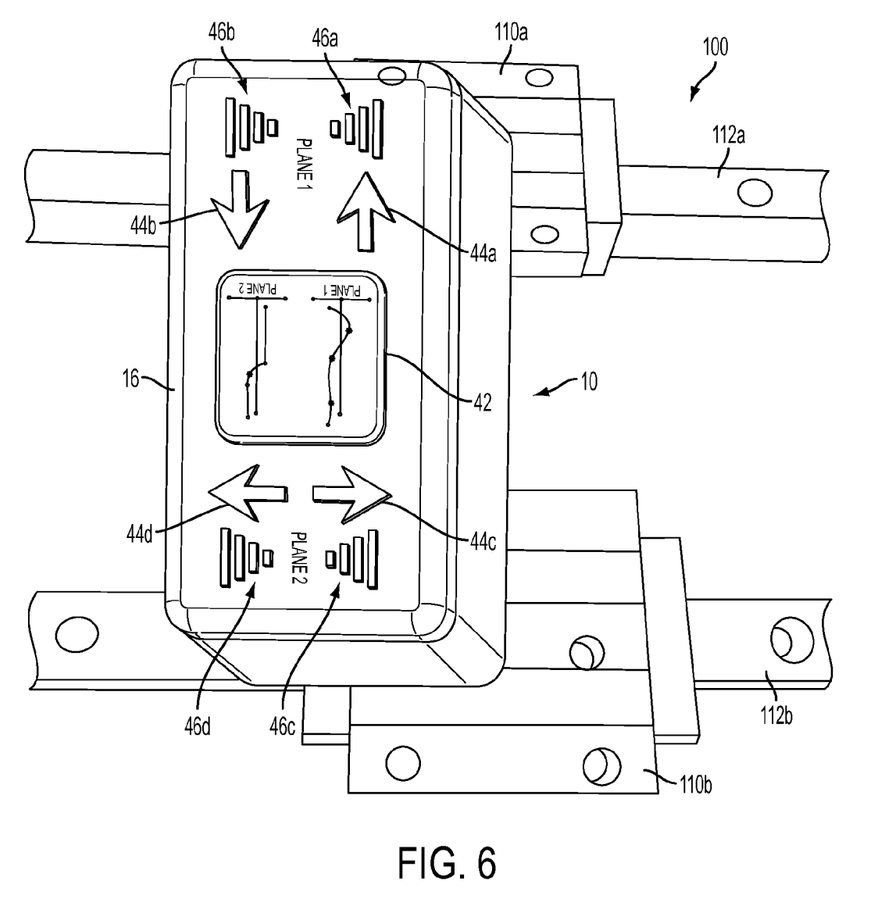
FIG. 6 is a front perspective view of another configuration of the rail system of FIG. 5.
Figure 7:
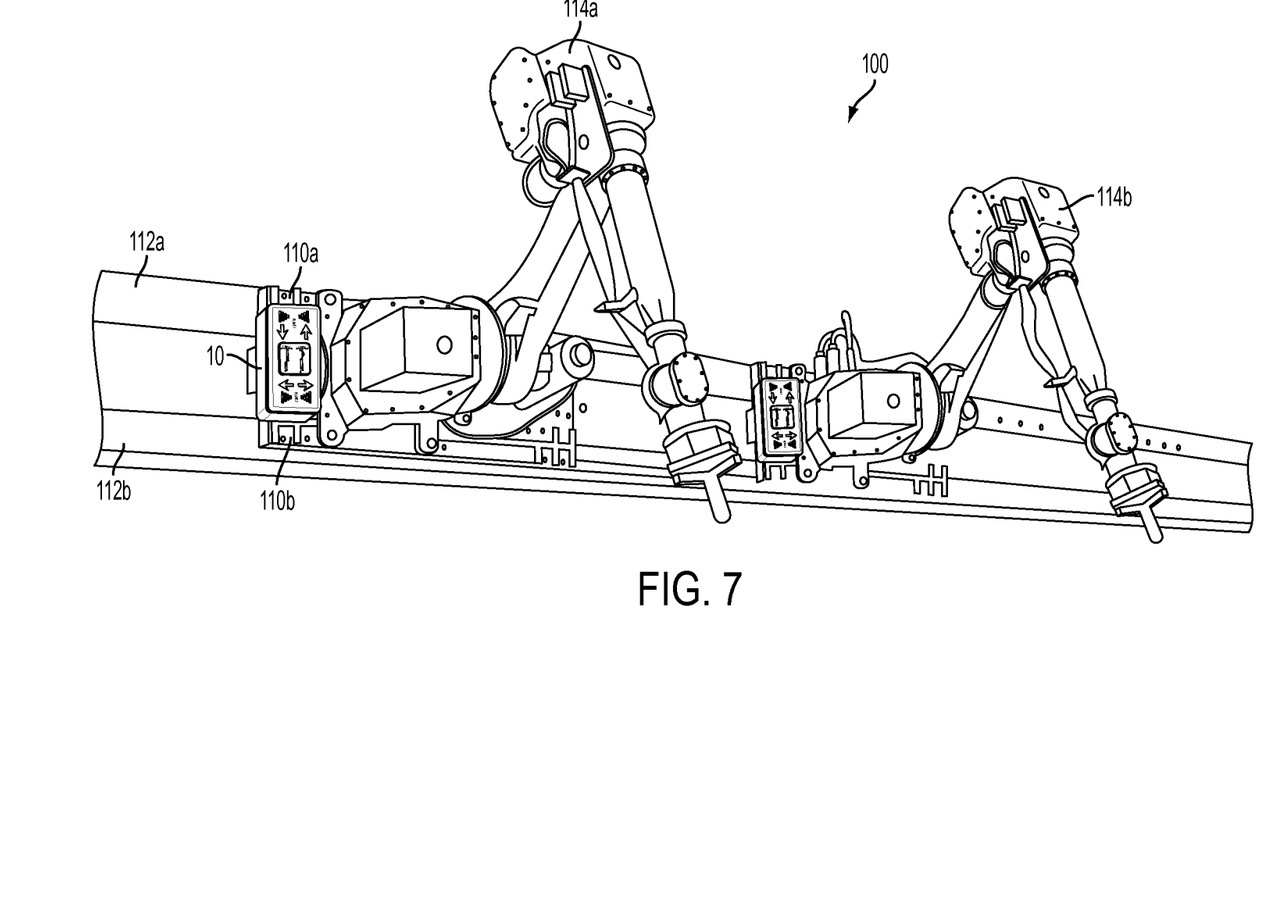
FIG. 7 is a front perspective view of the rail system of FIG. 5 including robotic components installed thereon.
Figure 8:
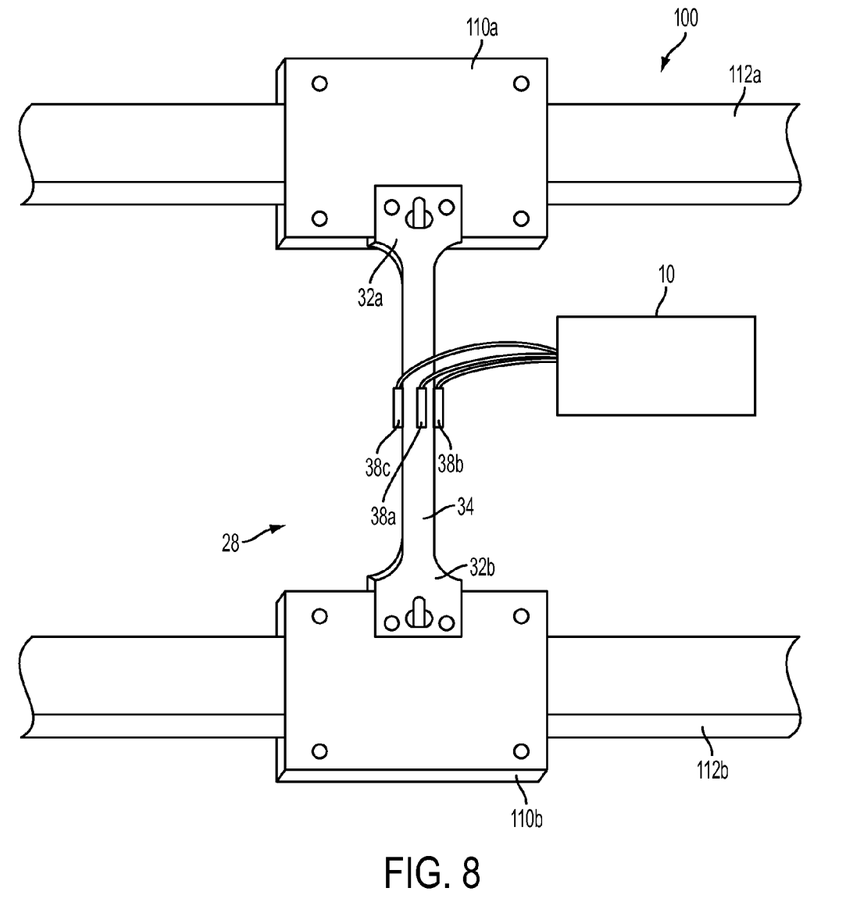
FIG. 8 is a front perspective view of another configuration of the rail system of FIG. 5.

With reference to FIGS. 5-7, the rail system 100 including at least two bearing blocks 110a, 110b is shown. The bearing blocks 110a, 110b are slidably connected to a rail 112a, 112b of the rail system 100. The bearing blocks 110a, 110b are configured to slide along a longitudinal length of the rails 112a, 112b. As shown in FIGS. 5 and 6, the bearing blocks 110a, 110b may be positioned on the rail system 100 in several different configurations. With reference to FIG. 5, in one aspect, the bearing blocks 110a, 110b may be positioned on the same rail 112a. The arrangement shown in FIG. 5 may be utilized to determine the straightness of the single rail 112a iii the rail system 100. In this aspect, the bearing blocks 110a, 110b may move along the same longitudinal axis of the rail 112a. The meter 10 as described in FIGS. 1-4 may be removably attached to the bearing blocks 110a, 110b. One end of the meter 10 may be attached to one bearing block 110a and an opposing end of the meter 10 may be attached to the other bearing block 110b. The attachment portions 32a, 32b of the flexible member 28 may be removably attached to each bearing block 110a, 110b to provide strain measurements based on the alignment of the bearing blocks 110a, 110b on the rail 112a. It is also contemplated that the flexible member 28 may be directly attached to the bearing blocks 110a, 110b without the use of the meter 10. During installation and/or operation of the rail system 100, the operator may move the bearing blocks 110a, 110b and the meter 10 along the intended path of the rail 112a. During the travel, any deviation from the desired path will be registered by the strain measuring elements 38a, 38b as the flexible member 28 deforms according to the strains exerted on the flexible member 28 due to the misalignment of the bearing blocks 110a, 110b and/or the rail 112a. The meter 10 will transmit this strain measurement information to the MBC 30 to notify the operator to correct the alignment problem of the the rail 112a. It is also contemplated that the arrangement shown in FIG. 5 may be provided with a flexible member 28 having a circular cross-section and two strain measuring elements 38a, 38b, which can measure the torsional strain of the flexible member 28. This torsional strain measurement will aid in determining if the rail is being twisted.

As shown in FIG. 6, the bearing blocks 110a, 110b may be positioned on two opposing rails 112a, 112b of the rail system 100. The arrangement shown in FIG. 6 may be utilized to determine whether the opposing rails 112a, 112b are perfectly parallel to one another. In this aspect, one bearing block 110a may move along a longitudinal axis of the first rail 112a and another bearing block 110b may move along a longitudinal axis of the second rail 112b. The rails 112a, 112b may be vertically offset from one another. In another aspect, the rails 112a, 112b may be horizontally offset from one another. The meter 10 as described in FIGS. 1-4 may be removably attached to the bearing blocks 110a, 110b. One end of the meter 10 may be attached to one bearing block 110a and an opposing end of the meter 10 may be attached to the other bearing block 110b. The attachment portions 32a, 32b of the flexible member 28 may be removably attached to each bearing block 110a, 110b to provide strain measurements based on the alignment of the bearing blocks 110a, 110b on the rail 112a. As shown further in FIG. 8, the flexible member 28 of the meter 10 may also be directly attached to the bearing blocks 110a, 110b without being housed in the meter 10. In this arrangement, the strain measuring elements 38a-38c are connected to the meter 10, which includes all of the same components described hereinabove, to send the measured strain information to the meter 10. As shown in FIG. 8, when using the meter 10 and/or the flexible member 28 on vertically offset rails 112a, 112b it is necessary to include three different strain measuring elements 38a-38c. Since one of the bearing blocks 110a may move relative to or ahead of the opposing bearing block 110b, a third strain measuring element is required to negate any strain measurements regarding the bending on the flexible member 28. To negate this bending measurement, a first strain measuring element 38c, for example, measures the bending or compression of the flexible member 28 in the horizontal direction. A second strain measuring element 38b measures the tension experienced by the flexible member 28. The bending strain measurement from the first strain measuring element 38c is then subtracted from the tension strain measurement of the second strain measuring element 38b to remove the bending strain from the strain measurements to calculate a true horizontal position of the rails 112a, 112b relative to one another. During installation and/or operation of the rail system 100, the operator may move the bearing blocks 110a, 110b and the meter 10 along the intended path of the rail 112a. During the travel, any deviation from the desired path will be registered by the strain measuring elements 38a-38c as the flexible member 28 deforms according to the strains exerted on the flexible member 28 due to the misalignment of the bearing blocks 110a, 110b and/or the rail 112a, 112b. The meter 10 will transmit this strain measurement information to the MBC 30 to notify the operator to correct the alignment problem of the rail 112a, 112b. It is also contemplated that the arrangement shown in FIG. 6 may be provided with a flexible member 28 having a circular cross-section and two strain measuring elements (not shown), but placed opposite each other and rotated 90 degrees in orientation, which can be used to measure the torsional strain of the flexible member 28. This torsional strain measurement will aid in determining if the rails 112a, 112b are not coplanar or parallel to one another.

As shown in FIG. 7, the rail system 100 may also include a robotic component 114a fixedly or removably attached to the bearing blocks 110a, 110b, which are used to move the robotic component 114a along the rails 112a, 112b. It is also contemplated that a plurality of robotic components 114a, 114b may be provided on the rail system 100. In one aspect, the robotic component 114a, 114b may be a robotic arm configured to retrieve different medications or medicaments stored in a medicine storage facility or room. The robotic component 114a, 114b may be moved in conjunction with the bearing blocks 110a, 110b along the rails 112a, 112b. The robotic component 114a, 114b may be slidably connected to the rails 112a, 112b using the configuration of the bearing blocks 110a, 110b shown in FIG. 5, FIG. 6, or FIGS. 5 and 6. Each robotic component 114a, 114b may be slidably connected to the rails 112a, 112b by using the same bearing block 110a, 110b configuration or by using different bearing block 110a, 110b configurations. Due to the high loading requirements imparted on the rails 112a, 112b by the robotic component 114a, 114b, multiple rails 112a, 112b and bearing blocks 110a, 110b may need to be used in each direction of the travel path of the rail system 100. Due to the tight and precise tolerances for proper operation of the rail system 100, if the rails 112a, 112b are not properly aligned parallel to one another in each plane of travel, the travel path of the robotic components 114a, 114b will destroy or damage the rails 112a, 112b and bearing blocks 110a, 110b during operation. By using the meter 10 on the rail system 100, an operator may be notified of any misalignment of the rails 112a, 112b so the operator may properly align the rails 112a, 112b before the bearing blocks 110a, 110b and/or rails 112a, 112b are destroyed or damaged.

With reference to FIGS. 1-7, a method of properly aligning at least one rail 112a, 112b of a rail system 100 is described. At least two bearing blocks 110a, 110b may be slidably connected to at least one rail 112a, 112b. The bearing blocks 110a, 110b may be slidably connected to the same rail 112a. The bearing blocks 110a, 110b may be slidably connected to two opposing rails 112a, 112b. The meter 10, as described hereinabove, may be removably attached to the bearing blocks 110a, 110b. An operator may move the bearing blocks 110a, 110b, including the meter 10, along the path of travel of the rails 112a, 112b. The meter 10 may measure any deviation in the alignment of the rails 112a, 112b or the alignment of the bearing blocks 110a, 110b on the rails 112a, 112b. The flexible member 28 of the meter 10 may twist or bend in accordance with the deviation in the bearing blocks 110a, 110b or rails 112a, 112b. The strain experienced by the flexible member 28 due to the twisting and/or bending of the flexible member 28 may be measured by the strain measuring elements 38a-38c. The strain information measured by the strain measuring elements 38a-38c may be transmitted or directed to the MBC 30. The MBC 30 may evaluate the strain measurements to determine the direction and/or magnitude of the strains that are being applied to the flexible member 28 due to the misalignment of the bearing blocks 110a, 110b and/or rails 112a, 112b. The strain measurements may be stored by the MBC 30 for future reference. The MBC 30 may also use the strain measurement information to display notifications on the front side 16 of the meter 10. The MBC 30 may send signals regarding the strain measurement information to the LCD screen 42 to notify the operator whether the rails 112a, 112b are properly aligned. The LCD screen 42 may display this information in a graphical representation or a textual representation. The MBC 30 may also send the strain measurement information to the directional visual indicators 44a-44d and/or the magnitude visual indicators 46a-46d to notify the operator of the direction and/or magnitude of the misalignment of the rails 112a, 112b, as described hereinabove. This described method and meter 10 may be used as a tool for installing the rails 112a, 112b of the rail system 100 and identifying any alignment problems (incorrectly machined mounting platforms, defective rails, or bearing blocks, etc.) before the robotic components 114a, 114b are placed into service. The method and meter 10 may also be used to quickly inspect the alignment of the rails 112a, 112b after the rail system 100 has been put into service as a preventative maintenance measure.

While aspects of an alignment meter 10 are shown in the accompanying figures and described hereinabove in detail, other aspects will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. An alignment meter for at least one rail of a rail system, comprising:
   a housing defining a cavity;
   a flexible member connected to the housing, wherein the flexible member is positioned in the cavity of the housing;
   at least one strain measuring element provided on the flexible member, wherein the housing comprises at least two mounting portions to removably attach the flexible member to at least two bearing blocks configured to travel along the at least one rail; and
   the at least one strain measuring element is configured to measure strain experienced by the flexible member.

2. The alignment meter as claimed in claim 1, wherein the at least one strain measuring element comprises at least two strain measuring elements,
   wherein a first of the at least two strain measuring elements is positioned to measure strain in a horizontal direction relative to the flexible member, and
   wherein a second of the at least two strain measuring elements is positioned to measure strain in a vertical direction relative to the flexible member.

3. The alignment meter as claimed in claim 1, wherein the at least one strain measuring element comprises at least three strain measuring elements,
 wherein a first and a second of the at least three strain measuring elements are positioned to measure strain in a horizontal direction relative to the flexible member; and
 wherein a third of the at least three strain measuring elements is positioned to measure strain in a vertical direction relative to the flexible member.

4. The alignment meter as claimed in claim 1, further comprising a microprocessor-based controller operatively connected to the at least one strain measuring element,
 wherein the microprocessor-based controller is configured to record strain measurements obtained by the at least one strain measuring element.

5. The alignment meter as claimed in claim 1, further comprising a liquid crystal display screen provided on a front surface of the housing, wherein the liquid crystal display screen is configured to display the strain measured by the at least one strain measuring element.

6. The alignment meter as claimed in claim 1, further comprising a plurality of magnitude visual indicators provided on a front surface of the housing, wherein the magnitude visual indicators are configured to display the magnitude of the strain measured by the at least one strain measuring element.

7. The alignment meter as claimed in claim 1, further comprising a plurality of directional visual indicators provided on a front surface of the housing, wherein the directional visual indicators are configured to display the direction of the strain measured by the at least one strain measuring element.

8. A linear rail system, comprising:
 at least one linear rail;
 at least two bearing blocks positioned to travel along the at least one linear rail; and
 an alignment meter arranged between the at least two bearing blocks, the alignment meter comprising:
  a housing defining a cavity;
  a flexible member connected to the housing, wherein the flexible member is positioned in the cavity of the housing;
  at least one strain measuring element provided on the flexible member, wherein a first end of the flexible member is removably attached to a first one of the at least two bearing blocks and a second end of the flexible member is removably attached to a second one of the at least two bearing blocks, and
 wherein the at least one strain measuring element is configured to measure strain experienced by the flexible member due to misalignment of at least one of the at least one linear rail and the at least two bearing blocks.

9. The linear rail system as claimed in claim 8, wherein the at least one strain measuring element comprises at least two strain measuring elements,
 wherein at least one strain measuring element is positioned to measure strain in a horizontal direction relative to the flexible member, and
 wherein at least one strain measuring element is positioned to measure strain in a vertical direction relative to the flexible member.

10. The linear rail system as claimed in claim 8, wherein the housing further comprises at least two mounting portions to removably attach the flexible member to the bearing blocks.

11. The linear rail system as claimed in claim 8, further comprising a microprocessor-based controller operatively connected to the at least one strain measuring element,
 wherein the microprocessor-based controller is configured to record strain measurements obtained by the at least one strain measuring element.

12. The linear rail system as claimed in claim 8, further comprising a liquid crystal display screen provided on a front surface of the housing, wherein the liquid crystal display screen is configured to display the strain measured by the at least one strain measuring element.

13. The linear rail system as claimed in claim 8, further comprising a plurality of magnitude visual indicators provided on a front surface of the housing, wherein the magnitude visual indicators are configured to display the magnitude of the strain measured by the at least one strain measuring element.

14. The linear rail system as claimed in claim 8, further comprising a plurality of directional visual indicators provided on a front surface of the housing, wherein the directional visual indicators are configured to display the direction of the strain measured by the at least one strain measuring element.

15. The linear rail system as claimed in claim 8, further comprising a notification device remotely connected to the alignment meter, wherein the notification device is configured to display strain measurement information measured by the at least one strain measuring element.

16. The linear rail system as claimed in claim 8, further comprising at least one robotic component connected to the at least two bearing blocks, wherein the at least two bearing blocks are configured to slide along the linear rail to move the robotic component from a first position to a second position.

* * * * *